United States Patent
Caliri

(10) Patent No.: US 10,450,100 B2
(45) Date of Patent: Oct. 22, 2019

(54) CONTAINER WITH IMPROVED STABILITY AND POUR SPOUT

(71) Applicant: John Stephen Caliri, Prineville, OR (US)

(72) Inventor: John Stephen Caliri, Prineville, OR (US)

(*) Notice: Subject to any disclaimer, the term of this patent is extended or adjusted under 35 U.S.C. 154(b) by 0 days.

(21) Appl. No.: 15/368,152

(22) Filed: Dec. 2, 2016

(65) Prior Publication Data

US 2017/0247138 A1 Aug. 31, 2017

Related U.S. Application Data

(60) Provisional application No. 62/262,012, filed on Dec. 2, 2015.

(51) Int. Cl.
*B65D 3/12* (2006.01)
*B65D 3/26* (2006.01)

(52) U.S. Cl.
CPC ........ *B65D 3/26* (2013.01); *B65D 3/12* (2013.01)

(58) Field of Classification Search
CPC .... B65D 3/26; B65D 3/12; B65D 5/70; B65D 3/06; B65D 5/029; B65D 5/265
USPC ........ 229/215, 217, 219, 214, 400, 404, 5.5, 229/128
See application file for complete search history.

(56) References Cited

U.S. PATENT DOCUMENTS

| | | | | |
|---|---|---|---|---|
| 2,069,281 A * | 2/1937 | Sebreny | ............... | B65D 5/742 229/130 |
| 2,097,647 A * | 11/1937 | Scott | ................... | B65D 5/745 229/125.02 |
| 2,300,703 A * | 11/1942 | Ray | ....................... | B65D 5/062 229/162.1 |
| 2,337,730 A * | 12/1943 | Berch | ................... | B65D 5/606 222/528 |
| 2,634,896 A * | 4/1953 | Graveno | ............... | B65D 5/068 229/214 |
| 2,687,840 A * | 8/1954 | Innes | ..................... | B65D 5/068 229/106 |
| 2,861,732 A * | 11/1958 | Parker | .................. | B65D 5/062 229/217 |
| 3,071,305 A * | 1/1963 | Zinn | ..................... | B65D 5/068 229/117.18 |
| 3,125,276 A * | 3/1964 | Zinn | ..................... | B65D 5/068 229/117.12 |
| 3,348,755 A * | 10/1967 | MacEwen | ............. | B65D 5/068 229/214 |
| 3,797,726 A * | 3/1974 | Reil | ........................ | B65D 5/065 229/216 |
| 3,915,296 A * | 10/1975 | Spencer | ............ | A47G 19/2205 206/217 |
| 3,981,430 A * | 9/1976 | Keim | .................... | B65D 5/745 229/215 |
| 4,185,764 A * | 1/1980 | Cote | ........................ | B65D 5/18 229/104 |
| 4,210,272 A * | 7/1980 | Sequin | ................... | B65D 47/10 215/253 |

(Continued)

*Primary Examiner* — Brian D Nash
(74) *Attorney, Agent, or Firm* — Mersenne Law

(57) ABSTRACT

A drinking device having a conical frustum shaped body sealed at its bottom, a foldable spout and an inward partial closure. The drinking device is preferably bio-degradable and its spout is re-sealable. The drinking device may also have protrusions for standing.

5 Claims, 4 Drawing Sheets

(56) References Cited

U.S. PATENT DOCUMENTS

| | | | | |
|---|---|---|---|---|
| 4,261,502 A * | 4/1981 | Ohmori | B29C 65/18 | 229/404 |
| 4,412,644 A * | 11/1983 | La Fever | B65D 3/06 | 220/270 |
| 4,620,665 A * | 11/1986 | McSherry | B65D 5/02 | 156/73.1 |
| 4,654,274 A * | 3/1987 | DeMars | A47G 23/0216 | 215/395 |
| 4,714,190 A * | 12/1987 | Morrocco | B65D 81/3851 | 220/315 |
| 4,791,030 A * | 12/1988 | DeMars | A47G 23/0216 | 215/395 |
| 4,850,528 A * | 7/1989 | Hanus | B65D 3/04 | 229/138 |
| 4,928,848 A * | 5/1990 | Ballway | A47G 19/2205 | 215/12.1 |
| 5,143,247 A * | 9/1992 | Gavle | A47G 23/0216 | 220/630 |
| 5,820,016 A * | 10/1998 | Stropkay | B65D 1/265 | 229/403 |
| 5,875,957 A * | 3/1999 | Yocum | B65D 5/48024 | 229/120.22 |
| 5,960,987 A * | 10/1999 | Solland | B65D 3/28 | 220/717 |
| 6,176,420 B1 * | 1/2001 | Sarson | B65D 3/20 | 229/128 |
| 6,176,615 B1 * | 1/2001 | Leimkuehler | B65D 31/10 | 229/214 |
| D469,691 S * | 2/2003 | Brondyke | D9/422 | |
| 6,592,504 B2 * | 7/2003 | Sarson | B65D 3/20 | 493/104 |
| 6,616,033 B1 * | 9/2003 | Schein | B65D 77/12 | 229/103.1 |
| 6,758,390 B2 * | 7/2004 | Sarson | B65D 3/20 | 229/125.02 |
| D495,209 S * | 8/2004 | Tranfaglia | D7/509 | |
| 6,955,289 B2 * | 10/2005 | Green | B65D 3/20 | 229/125.17 |
| 7,090,116 B2 * | 8/2006 | Cutler | A47G 19/2266 | 215/382 |
| 7,726,551 B2 * | 6/2010 | Abbott | B65D 3/06 | 229/138 |
| D657,950 S * | 4/2012 | Herman | D3/202 | |
| 8,505,807 B2 * | 8/2013 | Herman | B65D 1/265 | 229/128 |
| 8,540,114 B2 * | 9/2013 | Sarson | B65D 3/08 | 206/508 |
| 8,746,545 B2 * | 6/2014 | Houck | A47G 19/2272 | 229/128 |
| 8,864,015 B2 * | 10/2014 | Lu | B65D 3/20 | 229/128 |
| 8,955,738 B2 * | 2/2015 | Cai | B65D 5/6685 | 229/400 |
| 9,321,551 B2 * | 4/2016 | Lu | B65D 3/06 | |
| 9,751,655 B2 * | 9/2017 | Herman | B65D 5/0209 | |
| 9,845,173 B2 * | 12/2017 | Herman | B65D 1/265 | |
| 2012/0298663 A1 * | 11/2012 | Seidel | B65D 3/08 | 220/212 |

* cited by examiner

6

A

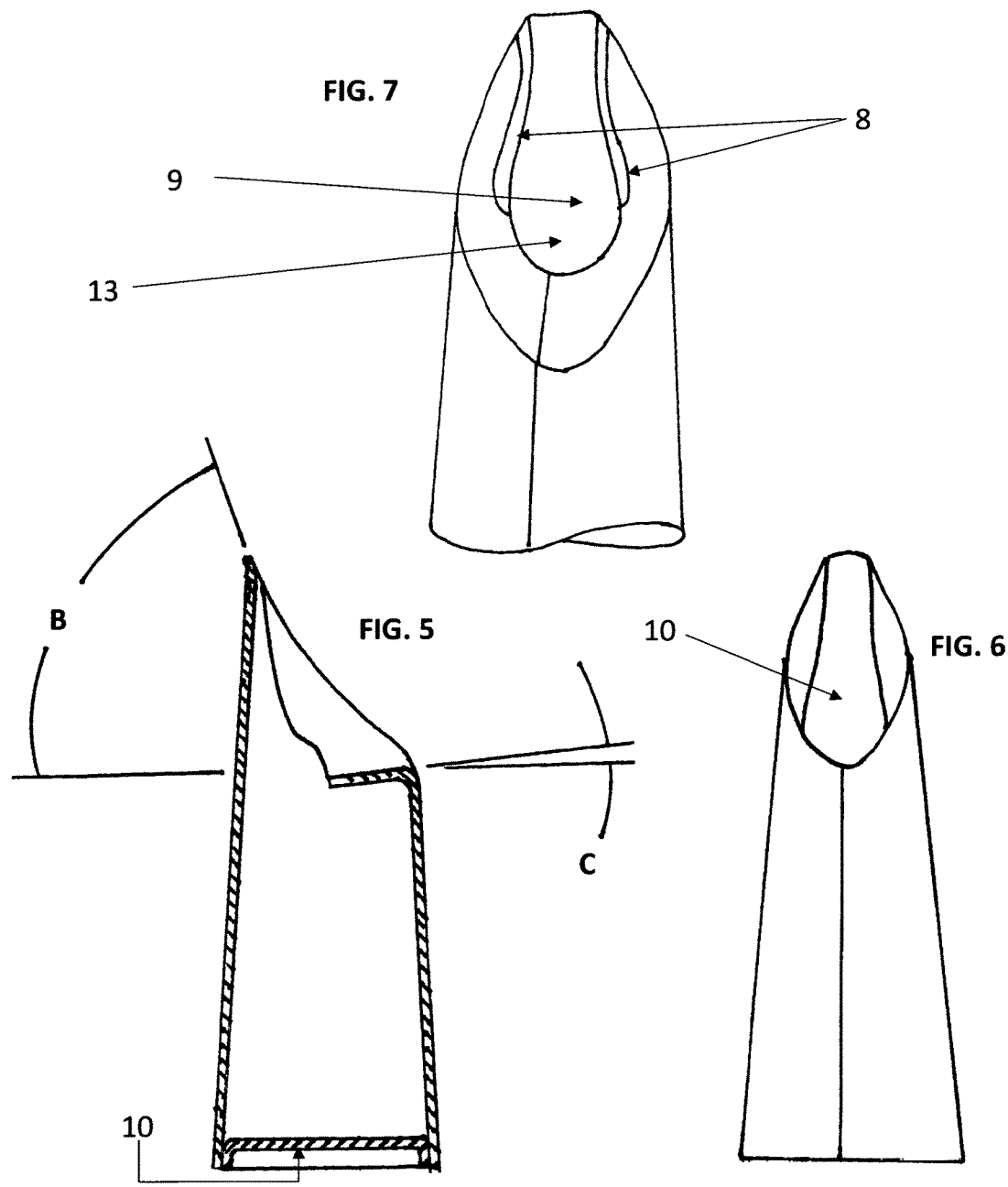

CONTAINER WITH IMPROVED STABILITY AND POUR SPOUT

BACKGROUND

Technical Field

The subject invention generally applies to the containment of fluids and pourable solids and the ease of dispensing or consuming them. The purpose of this invention is to help solve some of the inherent problems found in, and considered by many, a direct consequence of the current prior art; particularly with regards to the plastic beverage container industry.

Description of the Prior Art

Some scientist claim plastic pollution is a bigger environmental problem than Climate Change. In the U.S. alone an estimated 66 billion bottles of just water are consumed annually with 80% of the empties ending up in either a landfill or the ocean. One of six known ocean garbage patches is now called "The Great Pacific Garbage Patch" found in the North Pacific Gyre and estimated to be the size of Texas. The collections of these plastics gathered by the circulating ocean currents destroy the pertinent ecosystems where they congregate and ultimately circulate endlessly. Where the prior art has ultimately created an environmental crisis, due to the estimated 700 years it takes to decompose the plastic containers, in contrast our container takes only a few months to decompose.

Another irritant relative to the distribution of plastic beverage containers is the additional deposit money that is required by some states while purchasing the bottled water or beverage. The cost of goods is elevated while the plastic bottles are seldom returned and recycled. In contrast, paper food containers, which would include ours, do not require a deposit as they decompose rapidly in landfills and do not create a hazard or environmental crises.

Next is the harmful effects on our health that has been studied and proven to be a direct result of leaching chemicals from the plastic containers, such as Bisphenol A known as BPA which has been linked to a host of serious health problems included but not limited to:

Altered immune system function
Early puberty in girls and fertility problems
Decreased sperm count
Prostate and breast cancer; and
Diabetes and obesity to name a few.

To leave your plastic container in the sun will heighten the problem as the ultraviolet rays and high temperatures accelerate the leaching progression of the plastic's chemicals. In contrast, similar paper based beverage containers to ours, has been used in the dairy industry for decades with wonderful results and is not considered harmful to either the environment or our bodies. While taking all the above into account, we feel it is time to introduce a new sleek and attractive design, alternative to plastic, which can be introduced into the mainstream marketplace to fill a current market void. Some of the problems with the current biodegradable beverage containers are:

Many are collapsible pouches that cannot be set down without spilling; our design stands up by itself.
Many current paper beverage containers are square and do not lend themselves to the common round beverage holders found in cars, on bicycles etc. Our containers are round and compatible with most beverage holders.
Most paper beverage containers on the market today, simply put, are just unattractive and not something you would want to walk around with carrying them in public. Our container in contrast has a sleek and modem look. Additionally, patrons can make the connection that our product is biodegradable without even reading the label.
Most paper cup designs are narrow at the bottom and wide at the top, rendering the drinking vessel top-heavy and easy to knock over. Ours in contrast is wide at the bottom and gently narrows towards the top for superior balance and stability.

SUMMARY OF THE INVENTION AND ADVANTAGES

The preferred embodiment of the claimed invention provides a convenient aesthetically pleasing bio-degradable container for fluids and solids that is environmentally friendly and useful to the consumer. Additionally, it provides a means of resolving the current negative environmental impact of plastic containers.

BRIEF DESCRIPTION OF THE DRAWINGS

FIG. 5 is a section view of the container after having a first inward fold.

FIG. 6 is a front view of the container after the first inward fold.

FIG. 7 is an enlarged oblique downward detailed view of the container spout area after the first inward fold showing the spout opening detail.

DETAILED DESCRIPTION OF THE PREFERRED EMBODIMENT

Figure 1:
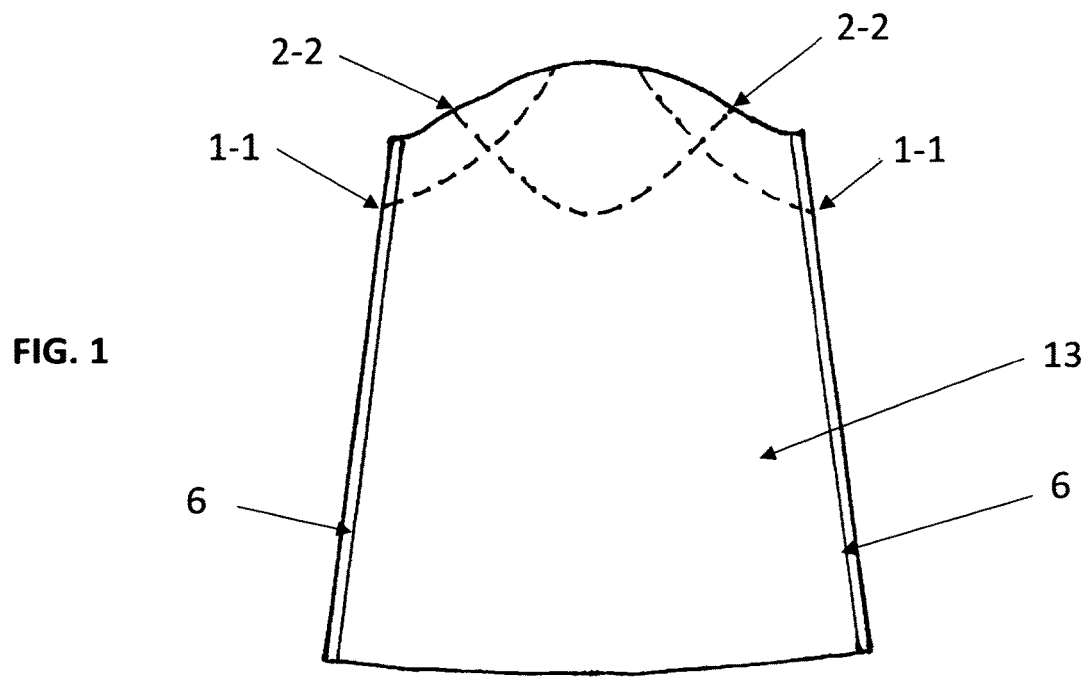
FIG. 1 is the inside plan view of the stock material showing the fold lines required to manufacture the embodiment with integral body and top seal.
Figure 3:
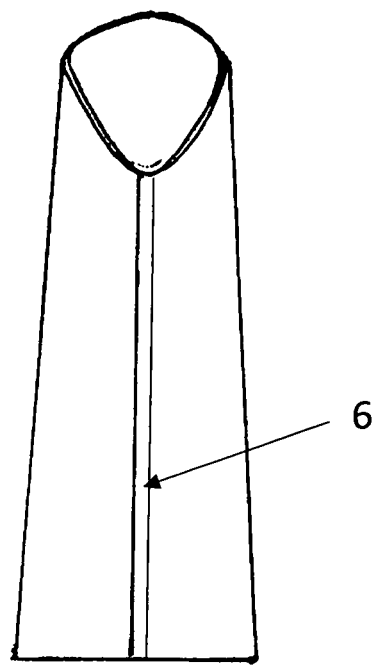
FIG. 3 is a front view of the stock material after having been formed into a conical frustum and sealed along the side

Referring to the Figures, wherein like numerals indicate like or corresponding features or parts throughout the several views the improved container is described. Referring to FIG. 1 shows the inside plan view of the stock material, which may be common milk carton material such as 300-330 gsm poly coated SBS paperboard or similar material 13. Also, shown in FIG. 1 are the fold lines required to manufacture the embodiment with integral body and top seal after the material has been folded into the preferred conical shape and sealed along the overlapping edges 6 (Ref. FIG. 3). Dashed line 1-1 indicates the first inward fold lines, 2-2 indicates the second inward fold line.

Figure 2:
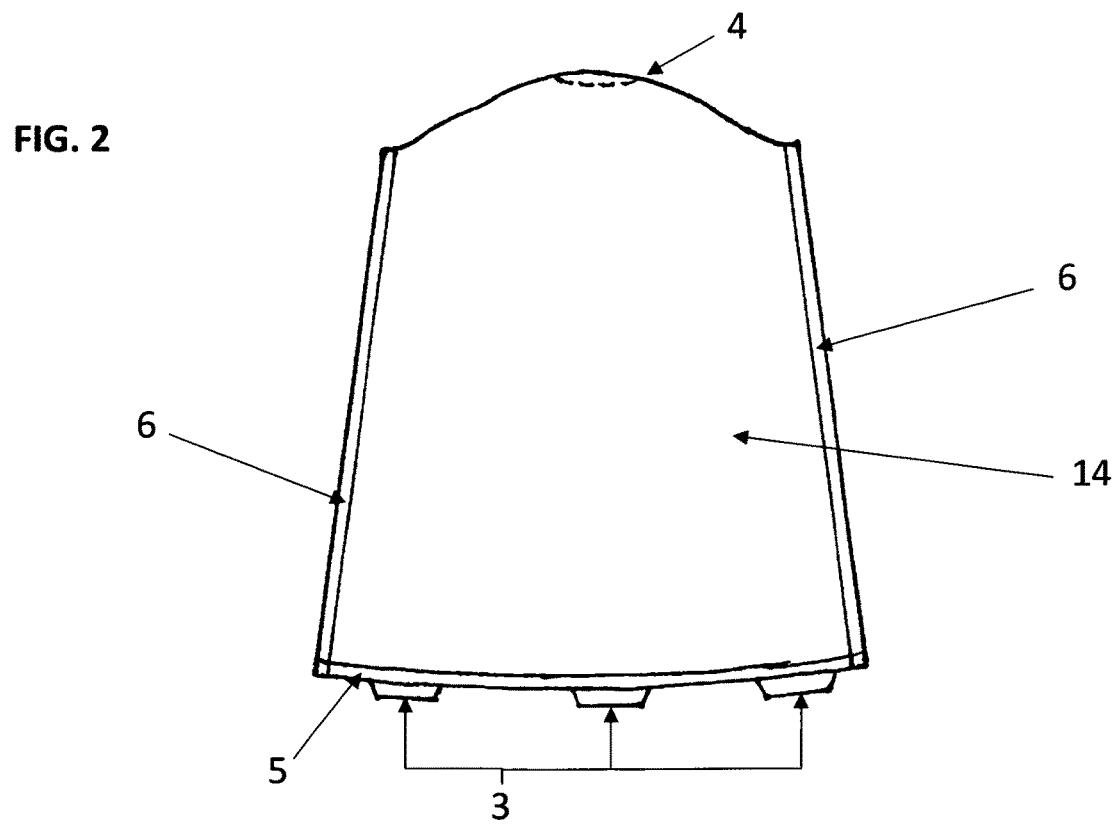
FIG. 2 is the plane exterior view of the stock material showing the side seal area and the fold line for the integral, "Pull Tab".

Referring to FIG. 2 which shows the plan exterior view 14 of the stock material 13 showing the over-lapping side seal areas 6 and the optional fold line 4 for the integral, "Pull Tab". Also shown is the area for the seal 5 to the bottom component (not shown), and the relative position of not less than three optional protrusions 3 for enhanced stability.

Figure 4:
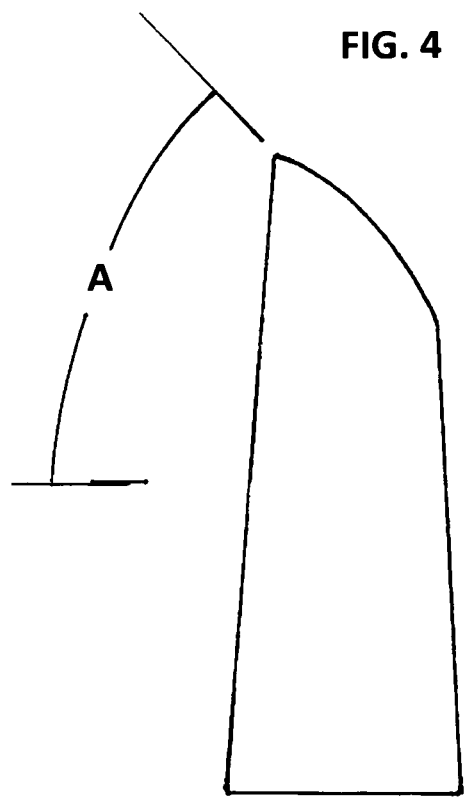
FIG. 4 is a side view of the stock material after having been formed into a conical frustum and sealed along the side.

Referring to FIG. 3 the front view having been formed from the stock material 13 into a conical frustum and sealed along the side 6 and FIG. 4 the side view of the same conical form showing the curved profile angle "A".

Referring to FIGS. 5 and 6 the container is shown after the first inward fold (1-1) has been completed (Ref. FIG. 1). FIG. 5 is a section view of the view shown in FIG. 6 and includes a sectioned view of one of many possible bottom closures commonly known in the art 10.

Referring to FIG. 7. FIG. 7 is a partial enlarged oblique downward detailed view of the container after the first inward fold (1-1) has been completed (Ref. FIG. 1). In this view the pour spout area 9 is shown. Also shown are the areas where the material of the first fold is sealed 8 to the stock material 13.

Figure 8:
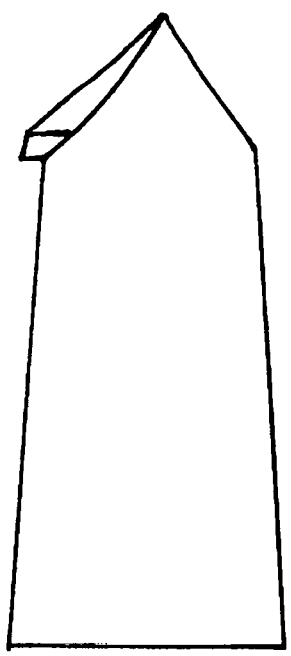
FIG. 8 is a side view after the second inward fold.
Figure 9:
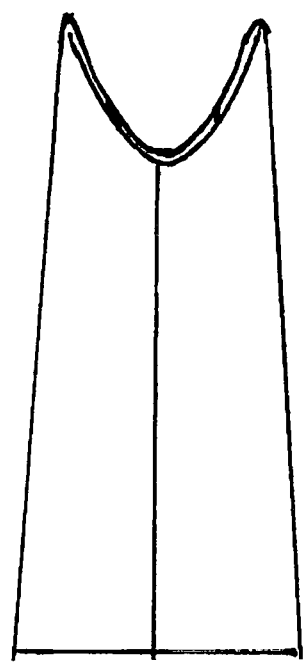
FIG. 9 is a front view after the second inward fold.

Referring to FIGS. 8 and 9 the container is shown after the second inward fold (2-2) has been completed. The fold is also sealed to the stock material 13.

What is claimed is:

1. A reclosable container with a spout, comprising: a body in a conical frustum shape with a closed bottom and an open top; a first portion of an upper end of the conical frustum folded inward along a curved spout crease to partially but not completely close an upper end of the conical frustum and to form reinforcing arcs supporting a spout opposite the curved spout crease; wherein the spout is folded along a curved closing crease opposite the curved spout crease and sealed to completely close the upper end of the conical frustum, a tip of the spout extending beyond a side of the container body near the spout crease.

2. The recloseable container of claim 1, wherein the conical frustum shape tapers so that a circumference of the closed bottom is greater than a circumference near the open top.

3. The recloseable container of claim 1 wherein the body is formed of paperboard.

4. The recloseable container of claim 1, filled with a liquid material.

5. The recloseable container of claim 1, filled with a pourable solid material.

\* \* \* \* \*